(12) United States Patent
Schomaker et al.

(10) Patent No.: US 10,183,606 B2
(45) Date of Patent: Jan. 22, 2019

(54) ROLL-OFF TRANSPORT DEVICE, PARTICULARLY A ROLL-OFF TIPPER, AND TRANSPORT UNIT HAVING A SWAP BODY VEHICLE AND A ROLL-OFF TRANSPORT DEVICE

(71) Applicant: BOMAG GmbH, Boppard (DE)

(72) Inventors: Rafael Schomaker, Lingen (DE); Joachim Ponstein, Gondershausen (DE); Maximilian Philippsen, Gingen an der Fils (DE); Thomas Thelen, Monreal (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 15/384,991

(22) Filed: Dec. 20, 2016

(65) Prior Publication Data

US 2017/0174114 A1   Jun. 22, 2017

(30) Foreign Application Priority Data

Dec. 21, 2015 (DE) .................. 10 2015 016 679

(51) Int. Cl.
| | |
|---|---|
| *B60P 1/48* | (2006.01) |
| *B60P 1/64* | (2006.01) |
| *B65D 88/12* | (2006.01) |
| *B65D 88/54* | (2006.01) |
| *B65D 90/00* | (2006.01) |
| *B65D 90/18* | (2006.01) |

(52) U.S. Cl.
CPC ............... *B60P 1/48* (2013.01); *B60P 1/6418* (2013.01); *B65D 88/129* (2013.01); *B65D 88/54* (2013.01); *B65D 88/542* (2013.01); *B65D 90/0033* (2013.01); *B65D 90/18* (2013.01)

(58) Field of Classification Search
CPC .... B65D 90/0033; B65D 88/129; B60D 1/24; B60D 2001/544
USPC ................................................. 280/488, 498
See application file for complete search history.

(56) References Cited

U.S. PATENT DOCUMENTS

| | | | | |
|---|---|---|---|---|
| 3,757,972 | A * | 9/1973 | Martin | .................... B60P 3/062 414/462 |
| 4,848,619 | A * | 7/1989 | Corompt | .............. B65D 88/121 220/1.5 |
| 5,393,191 | A * | 2/1995 | Alexander | ................ B60P 1/43 414/477 |

(Continued)

FOREIGN PATENT DOCUMENTS

| | | |
|---|---|---|
| DE | 2617638 A1 | 11/1977 |
| DE | 4338158 A1 | 5/1995 |

(Continued)

*Primary Examiner* — Mark C Hageman
(74) *Attorney, Agent, or Firm* — Wood Herron & Evans LLP

(57) ABSTRACT

The present invention relates to a roll-off transport device, particularly a roll-off tipper, comprising a bottom structure, a connecting structure which is connected, particularly rigidly, to the bottom structure on the face side and protrudes upwardly therefrom, and a loading arm connection arranged on the connecting structure for the loading arm of a swap body vehicle. The present invention also relates to a transport unit comprising a swap body vehicle and a roll-off transport device according to the present invention.

19 Claims, 4 Drawing Sheets

(56) References Cited

U.S. PATENT DOCUMENTS

| | | | | |
|---|---|---|---|---|
| 5,676,065 A * | 10/1997 | Locker | ............... | B65D 88/005 |
| | | | | 108/51.11 |
| 5,799,585 A * | 9/1998 | Brennan, Jr. | ...... | B65D 19/0026 |
| | | | | 108/53.1 |
| 5,806,863 A * | 9/1998 | Heger | ............... | B60P 1/6409 |
| | | | | 16/34 |
| 6,524,056 B1 * | 2/2003 | Kloster | ............... | B60P 3/075 |
| | | | | 224/571 |
| 7,306,273 B2 * | 12/2007 | Estes | ............... | B60P 1/6463 |
| | | | | 220/1.5 |
| 7,427,183 B2 * | 9/2008 | Stabeno | ............... | B60P 3/122 |
| | | | | 414/482 |
| 8,079,626 B2 * | 12/2011 | Estes | ............... | B65D 90/0033 |
| | | | | 220/1.5 |
| 2016/0040371 A1 | 2/2016 | Roetsch et al. | | |

FOREIGN PATENT DOCUMENTS

| | | |
|---|---|---|
| DE | 19926899 A1 | 8/2000 |
| DE | 202011110042 U1 | 4/2013 |
| DE | 102014011856 A1 | 2/2016 |
| EP | 2088094 B1 | 10/2011 |

* cited by examiner

ROLL-OFF TRANSPORT DEVICE, PARTICULARLY A ROLL-OFF TIPPER, AND TRANSPORT UNIT HAVING A SWAP BODY VEHICLE AND A ROLL-OFF TRANSPORT DEVICE

CROSS-REFERENCE TO RELATED APPLICATIONS

The present application claims priority under 35 U.S.C. § 119 of German Patent Application No. 10 2015 016 679.4, filed Dec. 21, 2015, the disclosure of which is hereby incorporated herein by reference in its entirety.

FIELD OF THE INVENTION

The present invention relates to a roll-off transport device, particularly a roll-off tipper, as well as a transport unit having a swap body vehicle and a roll-off transport device.

BACKGROUND OF THE INVENTION

Generic roll-off transport devices are known in the prior art. This generally involves transport devices which can be set down on the ground by a corresponding swap body vehicle, or loaded onto the transport vehicle from the ground, via a rolling movement. Such swap body vehicles, also called hook-lift vehicles, are known, for example, from DE 2617638 A1. Such swap body vehicles usually serve for receiving roll-off transport devices designed as troughs, units, and/or containers which can be set down. These are also referred to as roll-off tippers. A hook-lift device is provided to this end having a loading arm which is typically hydraulically movable and can be moved, particularly displaced and/or pivoted, on the machine frame of the swap body vehicle between a transport position and an unloading and/or loading position. For unloading, the transport device is normally pushed out over the rear edge of the machine frame of the swap body vehicle, where it tips and then rolls off onto the ground until reaching its final dropped position. The loading movement occurs respectively in the opposite direction.

As is known, these roll-off transport devices comprise a bottom structure, a connecting structure connected, particularly rigidly, to the bottom structure on a face side and protruding upwardly therefrom, and a loading arm connection arranged on the connecting structure for the loading arm of a swap body vehicle. Thus, in the present case the bottom structure refers to that device of the roll-off transport device which defines the bottom of the roll-off transport device. The connecting structure generally refers to that structure which ultimately connects the bottom structure to a coupling device for the loading arm of the swap body vehicle and enables force transmission for the unloading and/or loading process. The loading arm connection ultimately serves the mechanical coupling of the loading arm of the swap body vehicle in order to be able to load and/or unload the roll-off transport device.

The loading arm connection is normally a protruding support bracket, which a hook of the loading arm of the swap body vehicle can engage. In a practical application, however, there are frequently situations in which the roll-off transport device, still at least partially standing on the ground, must be maneuvered by the swap body vehicle, for example, into a favorable loading and/or unloading position. In this regard, however, known mounting brackets only allow for extremely limited maneuvering, frequently particularly in a range of less than 60°. Moreover, the hook of the loading arm of the swap body vehicle frequently glides along the bracket in a more or less uncontrolled manner during maneuvering, which can lead to instability of the roll-off transport device in extreme situations. This means that the application of such roll-off transport devices is frequently restricted and not possible particularly if a given situation requires regular extensive maneuvering between the swap body vehicle and the roll-off transport device.

SUMMARY OF THE INVENTION

The object of the present invention is to provide a possibility for improving the maneuverability of a generic roll-off transport device, particularly using a swap body vehicle.

One aspect of the present invention comprises modifying the loading arm connection of the roll-off transport device such that a pivot joint is now present instead of the previously used support bracket, and the loading arm connection is thus connected to the connecting structure via the pivot joint or is at least part of a pivot joint. The loading arm connection is thus, for example, rotatable about a rotation axis within a range of rotation relative to the connecting structure and thus also relative to the bottom structure. In this regard, the pivot joint is configured at least such that it allows for rotational movement of the loading arm connection relative to the connecting structure by at least one degree of freedom. However, the present invention also includes pivot joints that enable more than one degree of freedom, for example, by means of a spherical head or by coupling multiple individual joints, for example, two pivot joints with respectively one rotation axis, the rotation axes of both pivot joints ideally extending perpendicularly to each other. If the pivot joint is, for example, a spherical head, it only forms the pivot joint together with the coupled loading arm. Due to the pivot joint, it is possible to improve the maneuverability of the roll-off transport device and to simultaneously design it to be more controlled.

Embodiments of the roll-off transport device according to the present invention may relate to the configuration of the bottom structure. In this context, it is preferable to configure the bottom structure with a support frame comprising at least one longitudinal and/or transverse strut. In this regard, a longitudinal strut refers to a strut that extends in the longitudinal direction of the horizontal extension of the roll-off transport device, while a transverse strut extends transversely or at least diagonally to the longitudinal direction of the roll-off transport device. It is also possible to combine longitudinal and/or transverse struts with each other, such that the support frame has an overall ladder-like structure. Additionally or alternatively, it is possible to configure the bottom structure with an essentially continuous bottom surface in order to achieve a closed loading area, for example, towards the ground. The bottom structure is preferably configured as essentially rectangular. This means that in a vertical top view it has an essentially rectangular shape. To further improve the maneuverability of the roll-off transport device according to the present invention, at least one ground roller, particularly at least a pair of ground rollers, can be arranged preferably in the area of the face side opposite the connecting structure. Thus, the ground roller protrudes to the ground from the bottom structure and enables the roll-off transport device to roll off on the ground particularly if it is slightly lifted on the face side opposite the ground rollers, particularly through the loading arm of the swap body vehicle. Furthermore, the bottom structure may comprise slide rails on its ground side, said slide rails extending particularly in the longitudinal direction, in order to ease the loading and/or unloading process of the roll-off transport device onto/from the swap body vehicle. In this regard, the swap body vehicle may particularly comprise a loading roller on the rear side, over which the slide rails slide during the loading and/or unloading process. These slide rails are preferably formed by longitudinal struts of the bottom structure.

Another element of the roll-off transport device is the connecting structure, which may likewise be the subject matter of preferred embodiments. The main task of the connecting structure is to create a physical connection between the loading arm connection and the bottom structure. In this regard, the loading arm connection is normally arranged raised over the bottom structure in the vertical direction. This is preferably achieved by the connecting structure comprising at least one vertical strut and/or at least one transverse strut. A vertical strut extends essentially in the vertical direction, while a transverse strut extends with its longitudinal extension diagonally to perpendicularly to the vertical direction. The connecting structure is preferably configured such that it comprises two horizontally spaced vertical struts extending particularly parallel or symmetrically to each other, which are connected to each other directly or indirectly by means of at least one transverse strut. In this manner, an extremely stable and robust connecting structure can be achieved such that loads occurring during the loading and/or unloading process can be reliably diverted particularly at the connecting structure. It is also additionally or alternatively possible to configure the connecting structure with a face wall, in particular having a continuous surface. Thus, the face wall is a wall element which protrudes essentially perpendicularly from the horizontally extending bottom structure. With such a face wall, it is particularly also possible to achieve protection for the driver of the swap body vehicle. It is preferable if the connecting structure has a pivot joint support on its upper end in the vertical direction. The pivot joint support refers to that component by which the pivot joint is mechanically connected to the remaining connecting structure. The arrangement on the upper end in the vertical direction is beneficial in that, as a result, the roll-off transport device can be configured to be overall relatively flat. The maximum extension of the connecting structure in the vertical direction is preferably less than the longitudinal and diagonal extension of the bottom structure in a horizontal plane. This also aims for achieving a flattest possible roll-off transport device. Finally, it is preferable if the connecting structure is designed without protruding over a vertically protruding face wall in the direction of the opposite face side of the bottom structure. The face wall may form part of the connecting structure or it may be an independent element. What is essential is that no elements project from the face wall into the loading area of the roll-off transport device. In this manner, for example, damage to the transport object arranged on the roll-off transport device can be prevented. Additionally or alternatively, the connecting structure may be articulated on the bottom structure such that it is adjustable, in particular capable of being telescoped and/or pivoted. In this manner, it is possible to reduce the size of the connecting structure from its loading and/or unloading position, for example, to the stowage position if only very little free space is available.

The pivot joint is preferably rotatable at least about an essentially vertical rotation axis. This configuration of the pivot joint enables the roll-off transport device to be maneuvered with the help of a loading arm or by means of a travel and steering motion of the swap body vehicle on the ground when set down on the ground. Such pivot joints can be achieved particularly easily and robustly if the pivot joint is exclusively rotatable about a single, particularly vertical, rotation axis. Thus, it is preferable to configure the pivot joint such that it is rotatable about exactly one degree of freedom and, in particular, exclusively about one vertical rotation axis.

Variations of the pivot joint exist particularly also with regard to the range of rotation. The range of rotation refers to the maximum possible rotational movement about a reference axis, particularly about a vertical axis. It is preferable to configure the pivot joint such that it enables a range of rotation of at least 180°. This embodiment enables rotation by 90° to the right or left, respectively, relative to a "straight position". It has been found that such a range of rotation is sufficient for standard maneuvering.

In principle, the pivot joint is preferably configured as a single-axis rotary joint. This means that the pivot joint enables a rotational movement about precisely one, particularly vertically extending axis. Such a rotary joint is, in particular, a hinge joint. A preferred specific configuration of the pivot joint comprises therefore an outer joint sleeve and an inner component which is rotatable relative to the outer joint sleeve, a form fit device being present which restricts the maximum axial displacement of the inner component with respect to the outer joint sleeve. Thus, the task of the form fit device is to ensure that the two bearing parts of the pivot joint that are flexibly connected to each other remain engaged. The connecting structure is then preferably arranged on the outer joint sleeve and the loading arm connection is preferably arranged on the inner component, although reversed variations are also included in the present invention.

If the outer joint sleeve is connected to the connecting structure, this preferably occurs via a permanent connection. For this, for example, a support plate or an essentially horizontally extending transverse strut may be comprised in the connecting structure, in which the outer joint sleeve having a vertically extending sleeve axis is fitted. To this end, the support plate is also supported on both sides with vertical struts of the connecting structure and ideally additionally by respective transverse struts in order to obtain a particularly stable and robust overall structure.

A particularly cylindrical, smooth-walled contact area is preferably provided between the outer joint sleeve and the inner component, which extends coaxially to the rotation axis of the pivot joint. The larger this cylindrical contact area is designed, the more reliable a force transmission will be between the loading arm connection and the connecting structure.

The specific configuration of the loading arm connection may vary. In view of the already widespread swap body vehicles having a mounting hook on the loading arm, however, it is preferable if the loading arm connection is a hook receptacle. In general, a hook receptacle refers to a device in which a hook can be hooked or which can be engaged by a hook. Typical hook receptacles are, for example, designed as hook eyelets, etc. To simplify the coupling process of the loading arm of the swap body vehicle to the hook receptacle, the hook receptacle of the roll-off transport device may preferably comprise a merging aid, particularly merging jaws. These merging jaws are characterized by the fact that they have sliding surfaces converging in the direction of the hook receptacle, such that overall a type of guide funnel is obtained, with which the loading hook of the loading arm of the swap body vehicle is directed towards the hook receptacle of the roll-off transport device to an engagement position.

According to one embodiment, the loading arm connection has a connecting arm essentially protruding in the radial direction with respect to the rotation axis, on one end of which the hook receptacle is arranged and on the other end of which an element of the pivot joint is arranged, particularly the inner component of the hinge joint described above. The connecting arm facilitates the transfer of maneuvering motions onto the roll-off transport device, as a steering lever is ultimately achieved through it, the deflection of which can be controlled via travel and steering motions of the swap body vehicle. In this regard, it is ideal, for example, if the connecting arm has two longitudinal arms spaced to each other and one engaging pin connected to them on the face side. Thus, a free space exists between the connecting arms which on the face side is bridged by the engaging pin. The engaging pin in this case serves as a hook receptacle.

Additional embodiments of the roll-off transport device according to the present invention relate particularly to the improvement of functionality of the roll-off transport device. In this connection, for example, the bottom structure may comprise at least one guide rail, with which a path of movement is achieved for a transport object, particularly, for example, for a transport slide. Thus, with the guide rail, it is possible to move transport objects on the bottom structure guided relative to said bottom structure. Particularly a transport slide comes into consideration at this point, on which, for example, larger loads, such as particularly a milling unit, can be received and supported. Overall, such a configuration of the roll-off transport device enables that the transport objects loaded onto the bottom structure can be moved and, in particular, be unloaded from the bottom structure or loaded onto it without additional loading machines, such as forklifts, wheel loaders, etc. The transport slide may in this case be equipped with rollers which run along the guide rails. Of course, a more complex rail system may also be provided, which enables, for example, movement on the rails in and transversely to the longitudinal direction of the bottom structure.

Additionally or alternatively, the bottom structure may also comprise a rotation device, particularly in the form of a rotary plate. The rotation device may on the one hand be configured such that it can be extended from the bottom structure towards the ground and enables rotation of the roll-off transport device relative to the ground. The rotation device then comprises, for example, a foot or base which makes contact with the ground. However, the rotation device may alternatively be facing in the direction of the top side of the bottom structure and be used to rotate loaded transport objects relative to the bottom structure, particularly about a vertical axis. This option may be relevant, for example, if the transport object needs to be loaded on different sides of the bottom structure in a certain orientation in the horizontal plane even if spatial conditions are constricted. This is particularly the case for the transportation of milling units, as described in further detail below.

If the roll-off transport device comprises means that can be moved relative to the bottom structure, e.g., the aforementioned rotation devices, and the transport slide comprises further attachment elements as well, such as ramps or loads such as lighting devices, sensor devices, etc., it is preferred if the roll-off transport device has its own energy supply, particularly in the form of a battery. The roll-off transport device can then provide a corresponding energy supply without a connection to an external power source being necessary.

The roll-off transport device according to the present invention may comprise further attachment elements. These may be, in particular, a drive-on ramp, particularly at the bottom structure. The drive-on ramp is designed to bridge the vertical distance between the ground and the top side of the bottom structure by a ramp, such that, for example, transport objects can be pushed or driven onto the bottom structure more easily. Such a drive-on ramp may be configured as a separate element that can be attached and detached. However, it is preferred if the drive-on ramp is adjustable via a bearing device between a drive-on position and a stowage position, which may be achieved particularly via pivot adjustment and/or displacement adjustment.

Another embodiment of the roll-off transport device according to the present invention relates finally to a receptacle device for a milling unit of a road milling machine, particularly a large road milling machine. A milling unit of a road milling machine comprises a milling drum box and a milling drum arranged inside the milling drum box. Such a milling unit is described, for example, in DE 102014011856.8, which is hereby incorporated herein by reference. When transporting such a milling unit, it is preferable if the milling unit does not rest on the bottom structure directly via its individual milling tools as this could cause damage. The receptacle device is therefore adapted to the milling unit according to the present invention in such a manner that the milling unit rests on it either with a plurality of milling devices, for example, through a trough-like design of the receptacle device adapted to the radius of the milling drum, and/or, for example, has support elements which ensure that the milling unit rests on the roll-off transport device via elements of the milling drum box and not with the milling tools. Such support elements may be, for example, corresponding support blocks or other support elements. Ideally, the receptacle device is integrated in a transport slide for the milling unit.

Another aspect of the present invention relates finally to a transport unit having a swap body vehicle and a roll-off transport device. The swap body vehicle comprises a machine frame, travelling devices (particularly wheels), a cab, a propulsion, and a loading arm, which is particularly hydraulically powered and is adjustable between a transport position and a loading/unloading position. This design of the swap body vehicle in itself is well-known in the prior art. The loading arm of the swap body vehicle also comprises a coupling device, particularly a loading hook, for the loading arm connection of the roll-off transport device. It is important that the transport unit comprises a roll-off transport device according to the present invention, as described above. This makes it possible to reliably maneuver the roll-off transport device in a broad spectrum through steering and travel motions of the swap body vehicle even under tight spatial conditions.

BRIEF DESCRIPTION OF THE DRAWINGS

The present invention will be explained in further detail below based on the exemplary embodiments shown in the figures. In the schematic figures.

Like reference numerals will be used in the figures for structurally and/or functionally like parts, although not every element repeated in the figures is necessarily separately designated in each figure.

DETAILED DESCRIPTION OF THE INVENTION

Figure 1:
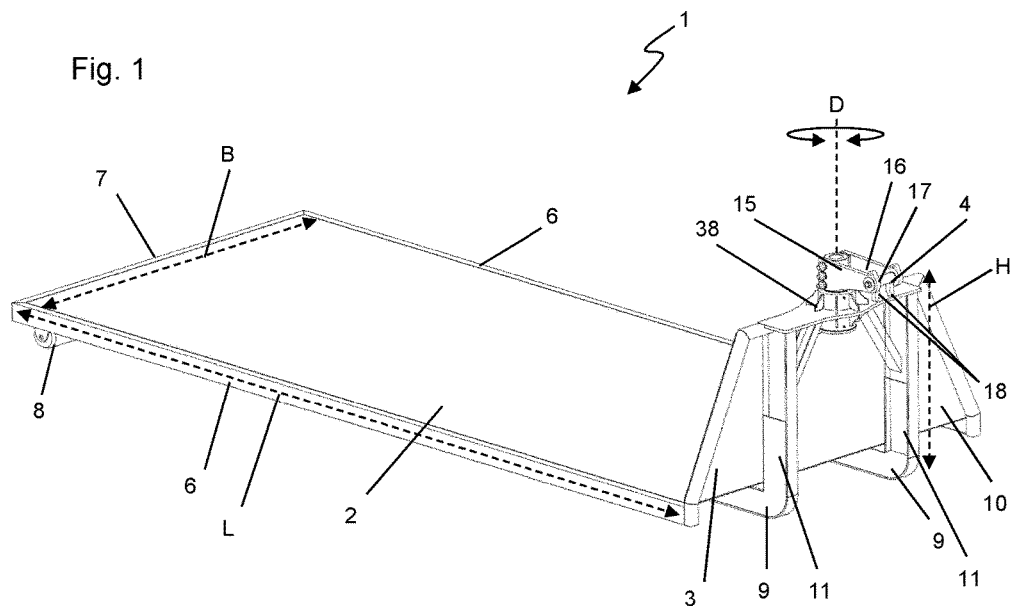
FIG. 1 is a perspective diagonal view of a roll-off transport device.
Figure 2:
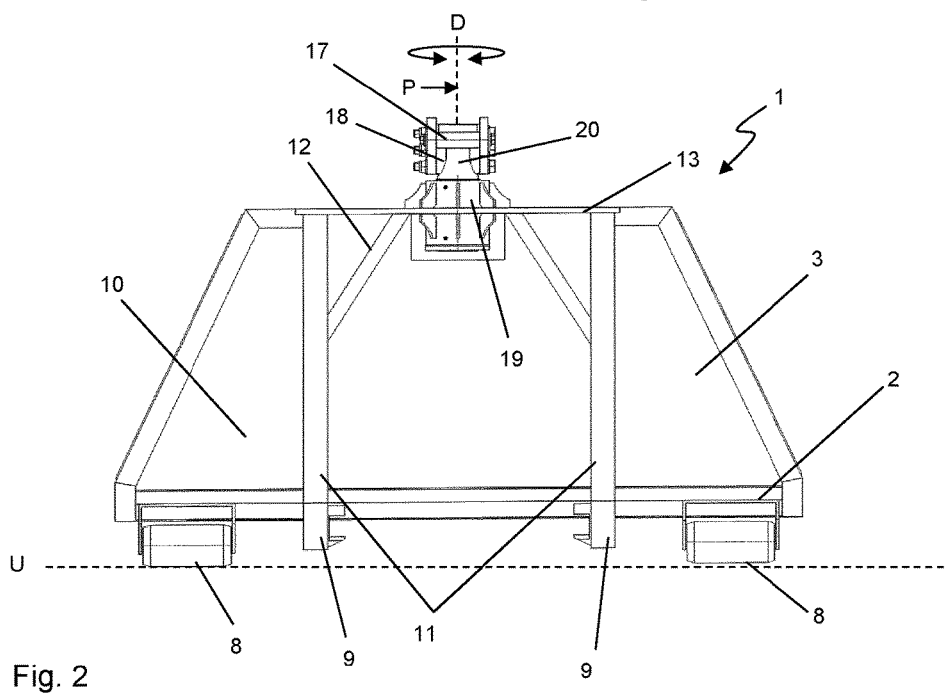
FIG. 2 is a front view of the roll-off transport device of FIG. 1.
Figure 3:
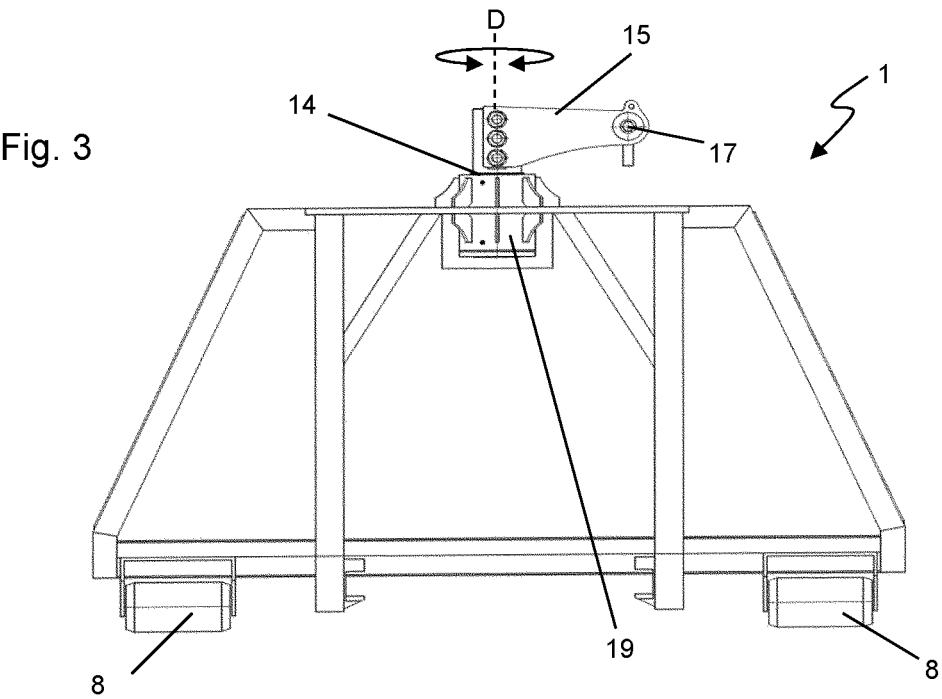
FIG. 3 is a front view of the roll-off transport device of FIG. 1 with rotated loading arm connection.

FIGS. 1 to 3 show elements of a roll-off transport device 1 according to a first embodiment. The roll-off transport device 1 comprises a bottom structure 2, a connecting structure 3, as well as a loading arm connection 4. In the present exemplary embodiment, the bottom structure 2 is configured as an essentially continuous-surface bottom plate 5 having a longitudinal extension L and a width B in the horizontal plane. The bottom plate 5 comprises the longitudinal edge sides 6 and the face edge side 7 opposite the connecting structure 3. The connecting structure 3 is connected to the bottom structure 2 on the side opposite the face side 7 and protrudes from the bottom structure 2 in the vertical direction with a height H. Furthermore, ground rollers 8 are arranged in the area of the face side 7, which project from the bottom side of the bottom structure 2 toward the ground U. Overall, a pair of ground rollers are present, as can be seen, for example, in FIG. 2. Both ground rollers 8 are arranged spaced to each other respectively towards the area of the longitudinal sides 6 in the area of the face side 7. Finally, the bottom structure 2 comprises two longitudinal struts 9 extending in the longitudinal direction below the bottom plate 5. The longitudinal struts 9 protrude less in the vertical direction from the bottom side of the bottom plate towards the ground than the ground rollers 8, as can be seen, for example, in FIG. 2. Overall, the bottom structure as viewed from above is configured essentially rectangular.

The connecting structure 3 is connected to the bottom structure 2 on the face side, specifically on a narrow side of the rectangular bottom structure 2, and comprises a face wall 10, vertical struts 11, and transverse struts 12. The vertical struts 11 are arranged in such a manner that they stand on the two longitudinal struts 9 of the bottom structure 2 and extend nearly to the upper edge of the connecting structure 3. The transverse struts 12 are arranged on the inside between the two vertical struts 11 and extend likewise nearly to the upper edge of the connecting structure 3, on which a support plate 13 is arranged, which is connected to the upper edge of the front wall 10, the vertical struts 11, and the transverse struts 12 at the face side. The face wall 10 is designed as a full surface and has the basic shape of a trapezoid tapering upwardly in the vertical direction.

The loading arm connection 4 is arranged on the support plate 13. The loading arm connection 4 comprises a connecting arm 15 with two longitudinal arms 16 spaced to each other, which are connected to each other on the face side via an engaging pin 17. The engaging pin 17 ultimately serves as a connecting element for the hook of a loading arm of a swap body vehicle, as will be described in further detail below. To ease the merging of the hook of the swap body vehicle towards the engaging pin 17, the loading arm connection 4 comprises two merging jaws 18, which are guide bars protruding downwards in the vertical direction with funnel-like guiding surfaces which are open upwardly and converge in the vertical direction.

What is important now is that the position of the engaging pin 17 is adjustable relative to the remaining roll-off transport device 1 about the vertical rotation axis D by means of the pivot joint 14. The loading arm connection 4 thus has a defined degree of freedom of movement relative to the remaining roll-off transport device 1, which can be used, in particular, for maneuvering the roll-off transport device 1 particularly via a swap body vehicle. This pivot movement can particularly be taken from a comparison of FIGS. 2 and 3, where the connecting arm 15 protrudes in longitudinal direction L in FIG. 2, whereas in FIG. 3 it is rotated by 90° in transverse direction B relative to the aforesaid position. Thus, in the present exemplary embodiment, the connecting arm 15 is freely rotatable about the vertical rotation axis D by more than 180°, specifically by 360°.

Figure 4:
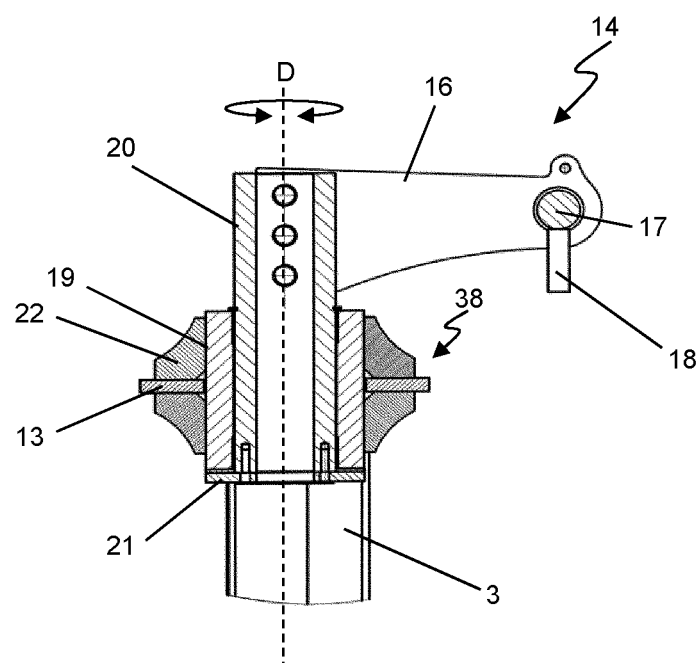
FIG. 4 is a vertical sectional view through the pivot joint of the roll-off transport device along rotation axis D in arrow direction B of FIG. 2.

Further details regarding the structure of pivot joint 14 and pivot joint support 38 can be taken particularly from the sectional view of FIG. 4. It shows a sectional view through the pivot joint 14 in a vertical section plane along the rotation axis D in a top view according to arrow P of FIG. 2. The pivot joint 14 comprises an outer joint sleeve 19 having a cylindrical passage opening extending along the rotation axis D as well as an inner component 20 which is rotatable about axis D relative to the outer joint sleeve 14, which essentially is a cylinder, specifically a hollow cylinder. The cylinder axis of the inner component 20 extends coaxially to the rotation axis D and to the longitudinal axis of the passage opening in the outer joint sleeve 19. Towards the bottom side, the inner component 20 is connected to a stop plate 21, which protrudes over it on the bottom face side of the outer joint sleeve 19 in the radial direction to the rotation axis D. The stop plate 21 thus prevents the inner component 20 from being pulled out of the pivot joint 14 by means of the form fit between the stop plate 21 and the face side of the outer joint sleeve 19. A corresponding form fit device or the like may be provided for the opposite face side of the outer joint sleeve 19. The outer joint sleeve 19 is welded to the support plat 13 and connected to it in a non-rotatable manner with additional, radially arranged welded struts 22.

FIG. 4 further illustrates that the connecting arm 15, of which only one longitudinal arm 16 is shown in FIG. 4, protrudes in the radial direction to the rotation axis D and, thus, forms a lever member on the inner component 20 relative to the rotation axis D. Specifically, the longitudinal arms 16 are screwed via suitable screw connections to the cylindrical inner component 20 in the area of the section protruding over the outer joint sleeve 19.

Figure 5:
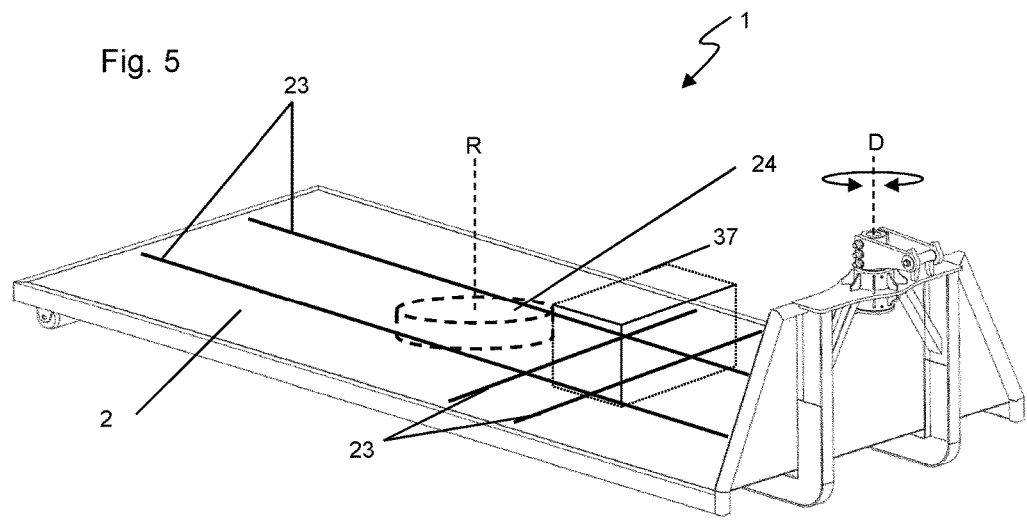
FIG. 5 shows an embodiment of the roll-off transport device with guide rails, transport slide and rotary plate.
Figure 6:
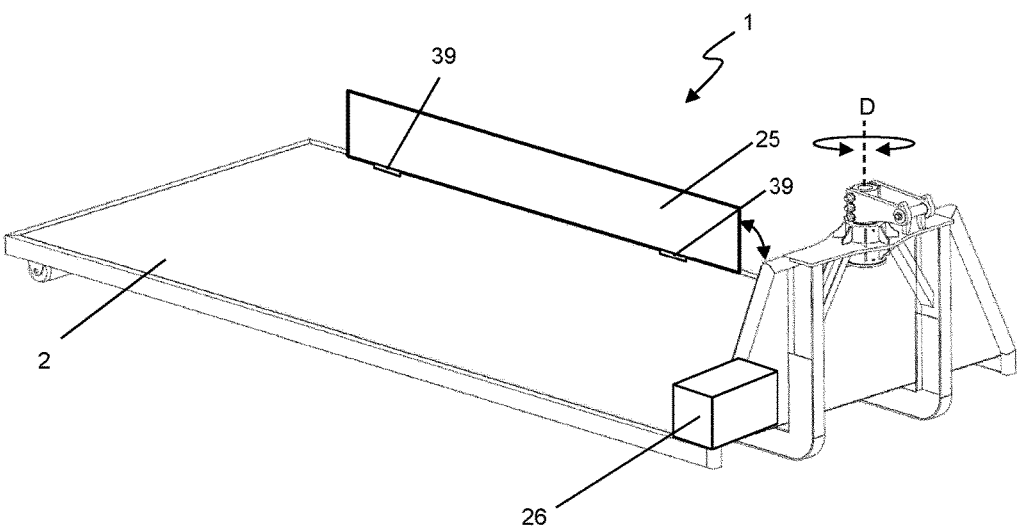
FIG. 6 shows another embodiment of the roll-off transport device with a drive-on ramp and a battery.

FIGS. 5 and 6 illustrate functional embodiments of the roll-off transport device 1. According to the present invention, they may be provided optionally with respect to each other or also together on a roll-off transport device 1.

According to FIG. 5, for example, it is possible to equip the bottom structure 2 with a rail system comprising at least one guide rail 23. In this regard, FIG. 5 illustrates that the guide rails 23 preferably extend in transverse direction B and/or in longitudinal direction L. Thus, with the guide rails 23, a structure is achieved with which a simplified movement of transport objects on the bottom structure 2 is possible. For this, for example, suitable wheels or the like may be provided on the transport object directly or an interconnected member, particularly, for example, a transport slide 37 (only indicated as a dotted line in FIG. 5). The transport slide 37 may be used to receive a transport object, particularly a milling unit of a large road milling machine, and to enable an improved and simplified mobility of the transport object on the bottom structure 2.

Additionally or alternatively, it is also possible to equip the roll-off transport device 1 with a rotation device 20, the task and functionality of which is to rotate either the bottom structure 2 relative to the ground or to provide a possibility to rotate a transport object placed on the bottom structure 2 with relative to the bottom structure 2 about the rotation axis R. Such a rotation device 24 may, for example, be a rotary plate having a support surface for a transport object and a corresponding joint connection to the bottom structure 2. Thus, with the help of the rotation device, it is possible to vary the position of a transport object on the bottom structure 2 or to change the relative position of the bottom structure 2 with respect to the ground without an external vehicle.

Additionally or alternatively, the scope of the present invention also includes configuring the roll-off transport device 1 according to FIG. 6 with at least one drive-on ramp 25. The task of the drive-on ramp 25 is to create a possibility to drive down from the bottom structure 2, in contrast, to drive onto the bottom structure 2 from the outer environment in a stepless manner. In other words, the drive-on ramp 25 bridges the vertical height difference between the ground and the top side of the bottom structure 2 via an inclined surface. In the present exemplary embodiment, the drive-on ramp 25 is configured as a single-piece element extending longitudinally along longitudinal direction L, although multi-piece variations can also be used. Furthermore, the drive-on ramp 25 is movable via pivot joints 39 of a bearing device between the transport position pivoted upward, as depicted in FIG. 6, and a drive-on position pivoted down. Additionally or alternatively, solutions comprising mountable/dismountable and/or linearly movable arrangements, etc., are conceivable in this case as well. Of course, multiple drive-on ramps 25 may also be provided, particularly on different sides of the bottom structure 2.

The roll-off transport device 1 of FIG. 6 further additionally or alternatively comprises an energy supply, specifically a battery 26. With that, roll-off transport device 1 comprises its own energy source, through which, for example, loads such as inter alia drive motors for transport devices, particularly transport slides, the adjusting movements of drive-on ramps, etc., lighting, sensor devices, etc., can be supplied with energy. Therefore, these loads can be supplied by the roll-off transport device 1 independently from an external supply vehicle. If larger energy quantities are required, the scope of the present invention also includes replacing the battery 26 with a generator.

Figure 7:
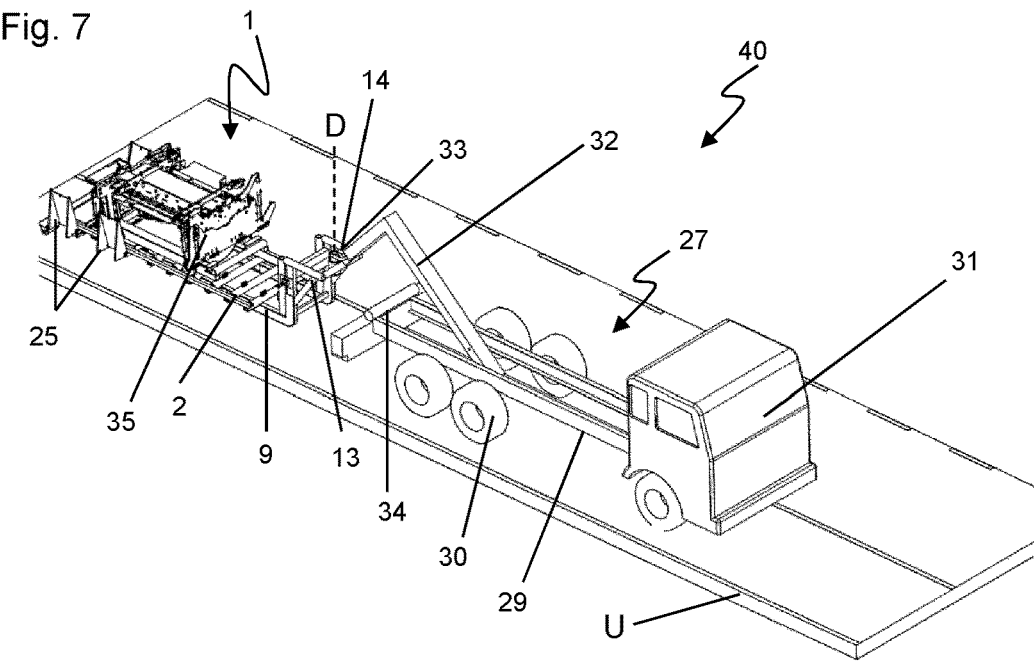
FIG. 7 shows a preferred application of a roll-off transport device with a swap body vehicle.
Figure 8:
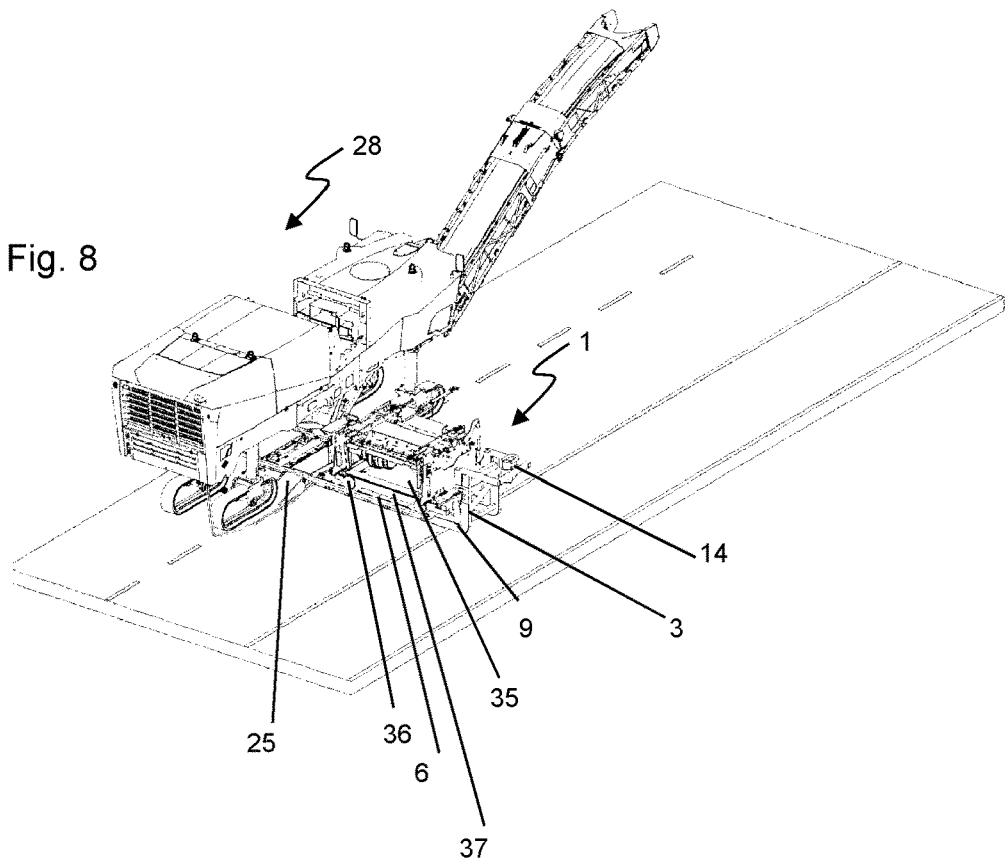
FIG. 8 shows the use of a roll-off transport device for transporting a milling unit of a road milling machine.

FIGS. 7 and 8 now illustrate a particularly preferable application of the roll-off transport device 1 according to the present invention. In FIG. 7, the roll-off transport device 1 is shown next to swap body vehicle 27 in a perspective diagonal view. Together they form a transport unit 40. In this specific application, the roll-off transport device 1 is used to deliver (or pick up) a milling unit 35 for a large road milling machine 28. Transport of the roll-off transport device 1 in a loaded state on the swap body vehicle 27 has therefore preceded the situation shown in FIG. 7.

Essential elements of the, particularly self-propelled, swap body vehicle are a machine frame 29, travelling devices 30, a cab 31, and a loading arm 32 that is hydraulically powered in the present case, with a coupling hook as a coupling device 33. This is provided for engaging the engaging pin 27. To bring the roll-off transport device 1 from the loaded state to the unloaded state shown in FIG. 7, the loading arm 32 is pivoted out from its transport position, in which it was pivoted-in or retracted towards the cab 31, and/or is moved to the rear side, whereby the roll-off transport device 1, in a tipping and rolling motion, is placed on the ground via the rear rollers 34 (which are preferably in contact with the longitudinal struts 9). The roll-off transport device 1 and the swap body vehicle 27 are arranged in a row in the longitudinal direction in FIG. 7. In this situation, it is now possible to maneuver, particularly, for example, to rotate by at least 90°, the roll-off transport device 1 in a broad spectrum through steering and travel motions of swap body vehicle 27. This is ultimately enabled by the pivot joint 14 described above. Specifically, it is also possible, for example, to position the roll-off transport device 1 transversely to the lane direction from the starting position shown in FIG. 7 in order to enable adequate mounting of the milling unit 35 on the large road milling machine 28. In other words, via the pivot joint 14 according to the present invention, the relative position of the milling unit 35 can, by maneuvering the roll-off transport device 1, be brought into a beneficial pre-position for mounting.

FIGS. 7 and 8 further illustrate the configuration of the bottom structure 2 of the roll-off transport device 1 as a ladder-like overall arrangement comprising a plurality of longitudinal and transverse struts. Furthermore, the roll-off transport device comprises guide rails 23, which extend in the longitudinal direction of the roll-off transport device 1 in the present case. A transport slide 37, which is specifically configured for receiving the milling unit 35, rolls over corresponding slide rollers 36 on the guide rails 23. Thus, the transport slide 37 has support structures, which are not shown in further detail, and which are adapted to the milling unit 35, in particular to its lower section, in order to enable a defined and, with respect to the milling tools, careful support of the milling unit coming from above on the transport slide. With the help of the transport slide 37, the milling unit 35 can be relatively easily moved on the bottom structure 2 and, in the specific application shown, for example, be slid underneath the bottom side of the large road milling machine 28.

In the exemplary embodiment of FIGS. 7 and 8, the roll-off transport device 1 also comprises drive-on ramps 25 arranged in pairs, such that the roll-off transport device 1 can be easily driven over in the rear side area of the bottom structure 2 by the large road milling machine 28, as shown in the figure. This likewise simplifies the mounting and dismounting process of the milling unit 35.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A roll-off transport device, comprising:
a bottom structure;
a connecting structure connected to the bottom structure on a face side and protruding upwardly therefrom; and
a loading arm connection arranged on the connecting structure for a loading arm of a swap body vehicle,
wherein the loading arm connection is connected to the connecting structure via a pivot joint and is rotatable relative to the connecting structure at least about a vertical rotation axis (D) within a range of rotation during use of the loading arm connection when connected to the loading arm of the swap body vehicle during a loading operation.

2. The roll-off transport device according to claim 1, wherein the bottom structure comprises at least one of the following features:
the bottom structure comprises a support frame with longitudinal and/or transverse struts;
the bottom structure comprises a bottom surface which is configured as a continuous surface;
the bottom structure has a rectangular shape; and
at least one ground roller is arranged in the area of a face side located opposite the connecting structure.

3. The roll-off transport device according to claim 1, wherein the connecting structure comprises at least one of the following features:
the connecting structure comprises at least one vertical strut and/or at least one transverse strut;
the connecting structure comprises a face wall which has a continuous surface;
the connecting structure comprises a pivot joint support on its upper end in the vertical direction;
the maximum extension of the connecting structure in the vertical direction is less than the longitudinal and transverse extension of the bottom structure in a horizontal plane; and
the connecting structure does not protrude over a vertically protruding face wall in the direction of the opposite face side of the bottom structure.

4. The roll-off transport device according to claim 1, wherein the pivot joint is designed such that the range of rotation is at least 180°.

5. The roll-off transport device according to claim 1, wherein the pivot joint comprises an outer joint sleeve and an inner component which is rotatable relative to the outer joint sleeve, a form fit device being present which restricts the maximum axial displacement of the inner component relative to the outer joint sleeve.

6. The roll-off transport device according to claim 5, wherein the outer joint sleeve is permanently arranged on a support plate of the connecting structure.

7. The roll-off transport device according to claim 1, wherein a contact area, which has a cylindrical shape and extends coaxially to the rotation axis (D) of the pivot joint, is provided between the outer joint sleeve and the inner component.

8. The roll-off transport device according to claim 1, wherein the loading arm connection is a hook receptacle, said hook receptacle comprising merging jaws.

9. The roll-off transport device according to claim 1, wherein the loading arm connection comprises a connecting arm protruding in the radial direction with respect to the rotation axis (D), on one end of which the hook receptacle is arranged, and on the other end of which an element of the pivot joint is arranged.

10. The roll-off transport device according to claim 9, wherein the connecting arm comprises two longitudinal arms spaced from each other and an engaging pin connected to them on the front face.

11. The roll-off transport device according to claim 1, wherein the bottom structure comprises at least one guide rail, with which a path of movement is achieved for a transport object.

12. The roll-off transport device according to claim 11, wherein the transport object comprises a transport slide.

13. The roll-off transport device according to claim 1, wherein the bottom structure comprises a rotation device for a loaded transport object.

14. The roll-off transport device according to claim 13, wherein the rotation device comprises a rotary plate.

15. The roll-off transport device according to claim 1, wherein an energy supply, is present.

16. The roll-off transport device according to claim 15, wherein the energy supply is a battery.

17. The roll-off transport device according to claim 1, wherein at least one drive-on ramp is arranged on the bottom structure, which drive-on ramp can be adjusted via a bearing device between a drive-on position and a stowage position.

18. The roll-off transport device according to claim 1, wherein a support device is provided for a milling unit of a road milling machine.

19. A transport unit, comprising:
a swap body vehicle comprising a machine frame, travelling devices, a cab, a drive propulsion, and a loading arm which can be adjusted between a transport position and a loading/unloading position, the loading arm comprising a coupling device for the loading arm connection of a roll-off transport device; and
a roll-off transport device,
wherein the roll-off transport device is configured according to claim 1.

* * * * *